United States Patent
Nagar et al.

(10) Patent No.: US 12,149,401 B2
(45) Date of Patent: Nov. 19, 2024

(54) IDENTIFYING PERSISTENT ANOMALIES FOR FAILURE PREDICTION

(71) Applicant: International Business Machines Corporation, Armonk, NY (US)

(72) Inventors: Seema Nagar, Bangalore (IN); Pooja Aggarwal, Bengaluru (IN); Dipanwita Guhathakurta, Kolkata (IN); Rohan R Arora, Danbury, CT (US); Amitkumar Manoharrao Paradkar, Mohegan Lake, NY (US); Larisa Shwartz, Greenwich, CT (US); Bing Zhou, Rye, NY (US); Noah Zheutlin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 17/456,168

(22) Filed: Nov. 23, 2021

(65) Prior Publication Data

US 2023/0164035 A1     May 25, 2023

(51) Int. Cl.
  *H04L 41/0631* (2022.01)
  *G06N 3/02* (2006.01)
  (Continued)

(52) U.S. Cl.
  CPC .............. *H04L 41/064* (2013.01); *G06N 3/02* (2013.01); *H04L 41/145* (2013.01);
  (Continued)

(58) Field of Classification Search
  CPC .................................................... H04L 41/064
  See application file for complete search history.

(56) References Cited

U.S. PATENT DOCUMENTS

| 8,914,317 B2 | 12/2014 | Biem |
| 8,949,677 B1 | 2/2015 | Brundage |

(Continued)

FOREIGN PATENT DOCUMENTS

| CN | 110008565 B | 12/2020 |
| CN | 112883368 A | 6/2021 |

(Continued)

OTHER PUBLICATIONS

Barford et al., "Network Performance Anomaly Detection and Localization", University of Wisconsin, <http://pages.cs.wisc.edu/~pb/infocom09a_final.pdf>, download from internet Sep. 30, 2021, 9 pages.

(Continued)

*Primary Examiner* — Guang W Li
(74) *Attorney, Agent, or Firm* — Scott S. Dobson

(57) ABSTRACT

A computer-implemented method and a computer system for identifying persistent anomalies for failure prediction. The computer system receives a time series data stream. The computer system received a predetermined number N and a predetermined number M which is a fraction of N. The computer system segments the time series data stream into N consecutive sliding windows. The computer system performs supervised persistent anomaly detection to determine whether anomalies across the N consecutive sliding windows are persistent, by using a binary classification model. The computer system performs unsupervised persistent anomaly detection to determine whether the anomalies across the N consecutive sliding windows are persistent. The computer system combines results of the supervised persistent anomaly detection and results of the unsupervised persistent anomaly detection to determine persistent anomalies.

24 Claims, 11 Drawing Sheets

(51) Int. Cl.
*H04L 41/14* (2022.01)
*H04L 41/147* (2022.01)
*H04L 41/16* (2022.01)
*H04L 43/06* (2022.01)

(52) U.S. Cl.
CPC ............ *H04L 41/147* (2013.01); *H04L 41/16* (2013.01); *H04L 43/06* (2013.01)

(56) References Cited

U.S. PATENT DOCUMENTS

| | | | |
|---|---|---|---|
| 9,020,689 B2 | 4/2015 | Smith | |
| 9,652,354 B2 | 5/2017 | Filimonov | |
| 10,103,960 B2 | 10/2018 | Boubez | |
| 10,296,406 B2* | 5/2019 | Johnson | G06F 11/0775 |
| 10,491,616 B2 | 11/2019 | Luo | |
| 10,855,548 B2 | 12/2020 | Garvey | |
| 10,929,258 B1 | 2/2021 | Gauf | |
| 11,061,915 B2 | 7/2021 | Park | |
| 11,621,969 B2* | 4/2023 | Dodson | H04L 43/20 706/50 |
| 11,949,703 B2* | 4/2024 | Salunke | G06F 18/217 |
| 2007/0058708 A1* | 3/2007 | Bultan | H03J 7/04 370/491 |
| 2018/0196922 A1* | 7/2018 | Abuelsaad | G06Q 50/01 |
| 2019/0036648 A1* | 1/2019 | Yanovsky | G06F 16/1752 |
| 2019/0108422 A1 | 4/2019 | Cantwell | |
| 2020/0134629 A1 | 4/2020 | Zoldi | |
| 2020/0267057 A1* | 8/2020 | Garvey | H04L 41/0816 |
| 2021/0117822 A1* | 4/2021 | Vishwakarma | G06N 20/00 |
| 2021/0144164 A1* | 5/2021 | Mathur | H04L 67/10 |
| 2022/0103444 A1* | 3/2022 | Ranjan | H04L 43/106 |
| 2022/0284259 A1* | 9/2022 | Brambila | G06N 3/04 |
| 2022/0397422 A1* | 12/2022 | Pereira Bulas Cruz | G01C 25/005 |
| 2023/0067842 A1* | 3/2023 | Yin | H04L 43/04 |
| 2023/0093130 A1* | 3/2023 | Fenoglio | G06F 18/2433 709/224 |
| 2023/0319083 A1* | 10/2023 | Torres Dho | G06N 20/10 726/23 |

FOREIGN PATENT DOCUMENTS

| | | |
|---|---|---|
| CN | 113094284 A | 7/2021 |
| CN | 111478904 B | 5/2022 |

OTHER PUBLICATIONS

Lee et al., "Precision and Recall for Range-Based Anomaly Detection", SysML'18, Feb. 2018, Stanford, CA, USA, <https://arxiv.org/pdf/1801.03175.pdf>, 3 pages.

Mell et al., "The NIST Definition of Cloud Computing", National Institute of Standards and Technology U.S. Department of Commerce, Special Publication 800-145, Sep. 2011, 7 pages.

"Patent Cooperation Treaty PCT International Search Report", International application No. PCT/IB2022/050453, International filing date Oct. 31, 2022, Date of mailing Mar. 22, 2023, 6 pages.

* cited by examiner

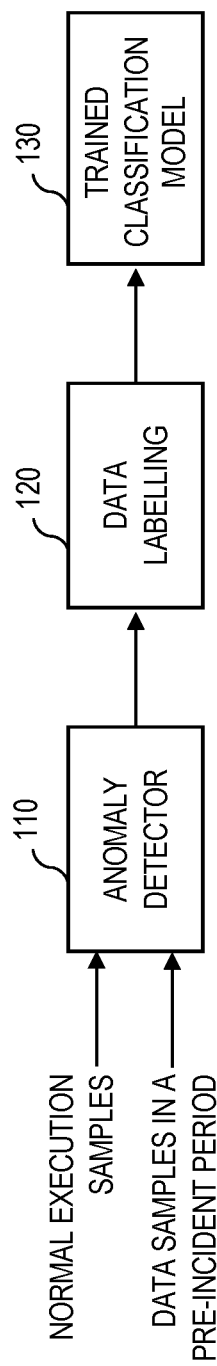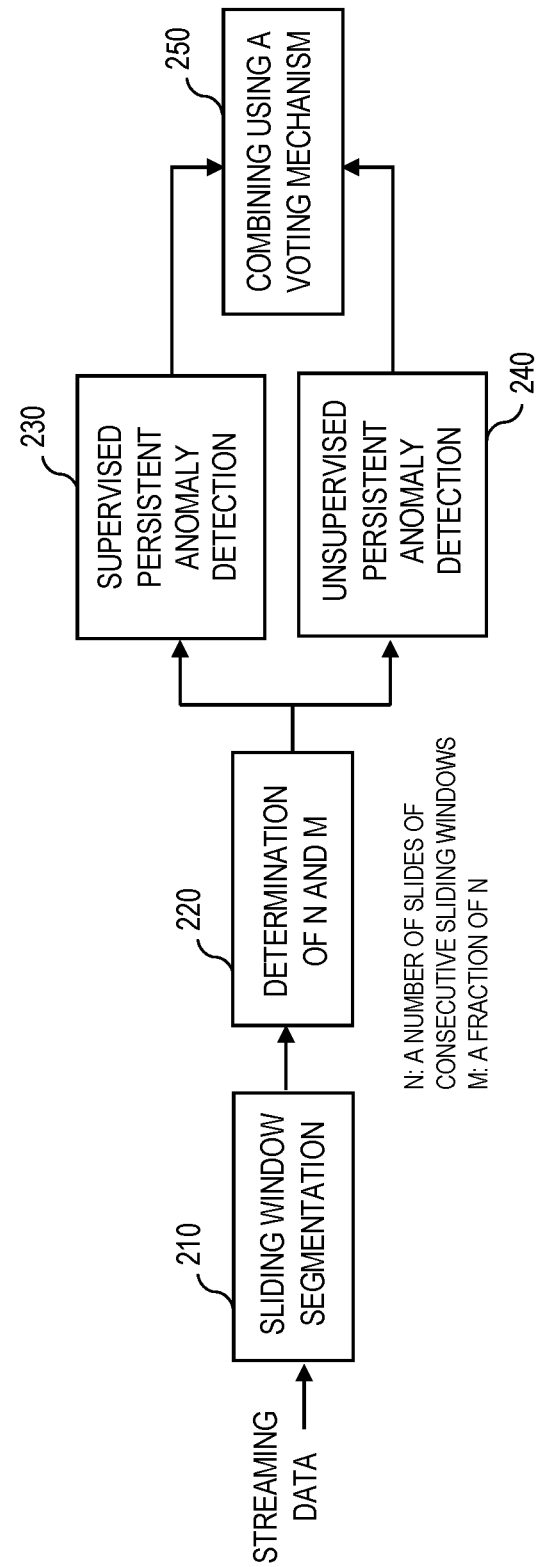

IDENTIFYING PERSISTENT ANOMALIES FOR FAILURE PREDICTION

BACKGROUND

The present invention relates generally to identifying persistent anomalies for failure prediction, and more particularly to identifying persistent anomalies for failure prediction by factoring in temporal evolution of anomalies.

Outages or incidents impacting availability of cloud native applications have become very common. The outage or incidents result in huge losses for organizations. The losses may be in the form of lost revenues, customer dissatisfactions, lost opportunities, among many others. Predicting a failure in advance may provide sufficient time to diagnose and troubleshoot the looming failure.

Many existing systems use anomaly detectors as an indication of failure. Some works have tried in building signatures on top of anomaly detection to predict failures. However, these existing approaches use only a set of anomalies (a window of anomalies), such as point, context, and collective (range), and they do not look at the temporal evolution of each of these types of anomalies such as persistent and transient anomalies; therefore, these approaches suffer with false positive.

SUMMARY

In one aspect, a computer-implemented method for identifying persistent anomalies for failure prediction is provided. The method includes receiving a time series data stream. The method further includes receiving a predetermined number N and a predetermined number M which is a fraction of N. The method further includes segmenting the time series data stream into N consecutive sliding windows. The method further includes performing supervised persistent anomaly detection to determine whether anomalies across the N consecutive sliding windows are persistent, based on a prediction that labels that are indicative of an outage occurrence are in at least M sliding windows, by using a binary classification model. The method further includes performing unsupervised persistent anomaly detection to determine whether the anomalies across the N consecutive sliding windows are persistent, based on clustering the anomalies and growth of clusters of the anomalies in at least M sliding windows. The method further includes combining results of the supervised persistent anomaly detection and results of the unsupervised persistent anomaly detection to determine persistent anomalies.

In another aspect, a computer system for identifying persistent anomalies for failure prediction is provided. The computer system comprises one or more processors, one or more computer readable tangible storage devices, and program instructions stored on at least one of the one or more computer readable tangible storage devices for execution by at least one of the one or more processors. The program instructions are executable to: receive a time series data stream; receive a predetermined number N and a predetermined number M which is a fraction of N; segment the time series data stream into N consecutive sliding windows; perform supervised persistent anomaly detection to determine whether anomalies across the N consecutive sliding windows are persistent, based on a prediction that labels that are indicative of an outage occurrence are in at least M sliding windows, by using a binary classification model; perform unsupervised persistent anomaly detection to determine whether the anomalies across the N consecutive sliding windows are persistent, based on clustering the anomalies and growth of clusters of the anomalies in at least M sliding windows; and combine results of the supervised persistent anomaly detection and results of the unsupervised persistent anomaly detection to determine persistent anomalies.

In yet another aspect, a computer-implemented method for identifying persistent anomalies for failure prediction is provided. The method includes receiving a time series data stream. The method further includes receiving a predetermined number N and a predetermined number M which is a fraction of N. The method further includes segmenting the time series data stream into N consecutive sliding windows. The method further includes performing supervised persistent anomaly detection to determine whether anomalies across the N consecutive sliding windows are persistent, based on a prediction that labels that are indicative of an outage occurrence are in at least M sliding windows, by using a binary classification model. The method further includes performing unsupervised persistent anomaly detection to determine whether the anomalies across the N consecutive sliding windows are persistent, based on a common section of sequences of the anomalies in at least M sliding windows. The method further includes combining results of the supervised persistent anomaly detection and results of the unsupervised persistent anomaly detection to determine persistent anomalies.

In yet another aspect, a computer system for identifying persistent anomalies for failure prediction is provided. The computer system comprises one or more processors, one or more computer readable tangible storage devices, and program instructions stored on at least one of the one or more computer readable tangible storage devices for execution by at least one of the one or more processors. The program instructions are executable to: receive a time series data stream; receive a predetermined number N and a predetermined number M which is a fraction of N; segment the time series data stream into N consecutive sliding windows; perform supervised persistent anomaly detection to determine whether anomalies across the N consecutive sliding windows are persistent, based on a prediction that labels that are indicative of an outage occurrence are in at least M sliding windows, by using a binary classification model; perform unsupervised persistent anomaly detection to determine whether the anomalies across the N consecutive sliding windows are persistent, based on a common section of sequences of the anomalies in at least M sliding windows; and combine results of the supervised persistent anomaly detection and results of the unsupervised persistent anomaly detection to determine persistent anomalies.

In yet another aspect, a computer-implemented method for training a binary classification model of identifying persistent anomalies for failure prediction. The method includes receiving data samples in a pre-incident period with respect to a historical outage and normal execution samples as training data. The method further includes segmenting the data samples into N consecutive sliding windows. The method further includes, for the data samples in the pre-incident period, assigning each sliding window with a label which is indicative of the historical outage. The method further includes, for the normal execution samples, assigning each sliding window with a label which is indicative of no historical outage. The method further includes training the binary classification model with assigned labels of the N consecutive sliding windows, using a long short-term memory (LSTM) based neural network. In the computer-implemented method, the binary classification model is used by supervised persistent anomaly detection to determine whether anomalies in a time across the N consecutive sliding windows are persistent.

BRIEF DESCRIPTION OF THE SEVERAL VIEWS OF THE DRAWINGS

FIG. 1 is a diagram illustrating an offline training phase of identifying persistent anomalies for failure prediction, in accordance with one embodiment of the present invention.

FIG. 2 is a diagram illustrating an online phase of identifying persistent anomalies for failure prediction, in accordance with one embodiment of the present invention.

DETAILED DESCRIPTION

Figure 3A:
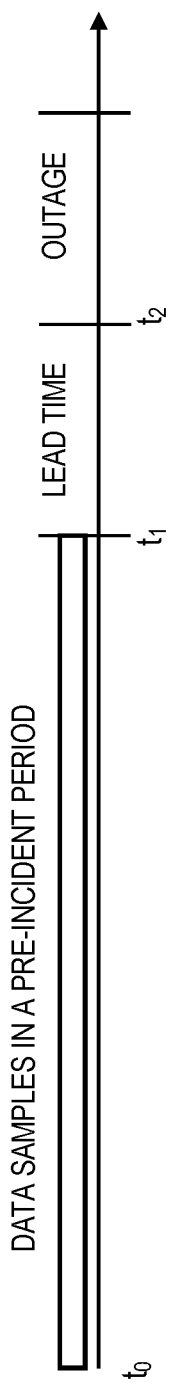
FIG. 3(A), FIG. 3(B), and FIG. 3(C) are diagrams illustrating data preparation and labelling, in accordance with one embodiment of the present invention.

Embodiments of the present invention propose a system and method for detecting persistent anomalies by factoring in the temporal evolution of anomalies. The system and method combine supervised persistent anomaly detection and unsupervised persistent anomaly detection, to find temporal growth or pattern and to find the persistence of anomalies.

In the unsupervised persistent anomaly detection, the proposed system and method identify anomalies from a stream of logs and metrics. The proposed system and method cluster the anomalies in N consecutive sliding windows. Through clustering the anomalies in N consecutive sliding windows, the proposed system and method factor in the space similarity as well as the temporal nature. The proposed system and method observe the growth of the clusters. In response to determining that a fraction of clusters grows at a significant rate, the proposed system and method determine that the anomalies are persistent anomalies.

In the supervised persistent anomaly detection, the proposed system and method use the data samples prior to several failure instances and normal execution data samples for the offline training phase. The data samples may be logs or metrics. From the normal execution data samples, the proposed system and method mark anomalies for each sliding window size as 0, which is not indicative of a failure in future. From the data samples prior to several failure instances in an observation window size, the proposed system and method get the anomalies prior to the failure instances and determine an observation window prior to the failure instances. The observation window size can be pre-configured; for example, if a failure instance occurs at 8:00 PM, then the system and method use all the data points from 6:30 to 8:00 PM. The system and method segment the observation window into consecutive sliding windows and mark each sliding window as 1 which is indicative of an outage. The system and method train a binary classification model using indicative of the outage of each sliding window. At runtime, the system and method take N consecutive sliding windows to predict anomalies in the N consecutive sliding windows using the trained binary classification model. If a fraction of the consecutive sliding windows indicate with more than 90% confidence that there is failure looming, then the system and method mark those anomalies in the N consecutive sliding windows as persistent.

The proposed system and method combine the results of the unsupervised persistent anomaly detection and the results of the supervised persistent anomaly detection. The proposed system and method further classify the anomalies as either persistent or not persistent, by using the voting mechanism.

The proposed system and method in the present invention are implemented on one or more computing devices or servers. A computing device or server is described in more detail in later paragraphs with reference to FIG. 10. The proposed system and method in the present invention may be implemented in a cloud computing environment. The cloud computing environment is described in more detail in later paragraphs with reference to FIG. 11 and FIG. 12.

FIG. 1 is a diagram illustrating an offline training phase of identifying persistent anomalies for failure prediction, in accordance with one embodiment of the present invention. The offline training phase includes anomaly detector 110 which receives both normal execution samples and prior failure execution samples (or data samples in a pre-incident period). The preparation of the data samples will be discussed in detail in a late paragraph with reference to FIG. 3(A). The offline training phase further includes data labeling 120, through which the normal execution samples and the prior failure execution samples (data samples in a pre-incident period) are labeled for N consecutive sliding windows. The data labeling will be discussed in detail in later paragraphs with reference to FIG. 3(B) and FIG. 3(C). The offline training phase further includes trained classification model 130. Both labeled data samples in a pre-incident period and labeled normal execution samples are fed to the trained classification model 130. Training the classification model will discussed in detail in a later paragraph with reference to FIG. 4.

FIG. 2 is a diagram illustrating an online phase of identifying persistent anomalies for failure prediction, in accordance with one embodiment of the present invention. At runtime, the proposed system and method receives a time series data stream. The online phase includes sliding window segmentation 210, determination of N and M 220 (where N is a number of slides of consecutive sliding windows and M is a number which is a fraction of N), supervised persistent anomaly detection 230, unsupervised persistent anomaly detection 240, and combining using a voting mechanism 250. Sliding window segmentation 210 and determination of N and M 220 will be discussed in detail in later paragraphs with reference to FIG. 5. Supervised persistent anomaly detection 230 will be discussed in detail in later paragraphs with reference to FIG. 6. Unsupervised persistent anomaly detection 240 will be discussed in detail in later paragraphs with reference to FIG. 7 and FIG. 8. Combining using a voting mechanism 250 will be discussed in detail in later paragraphs with reference to FIG. 9.

Figure 3B:
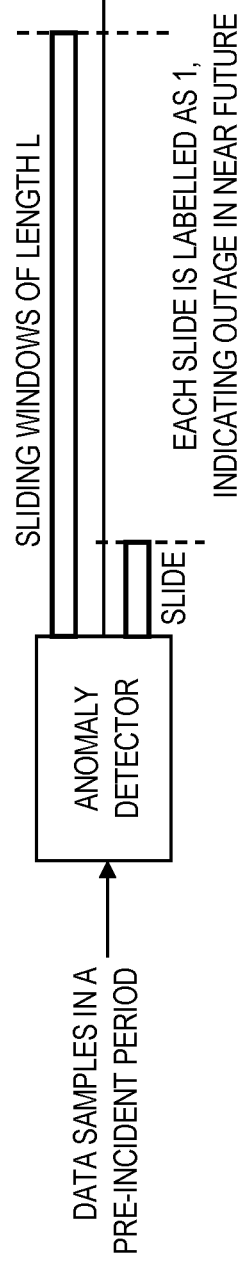
Figure 3C:
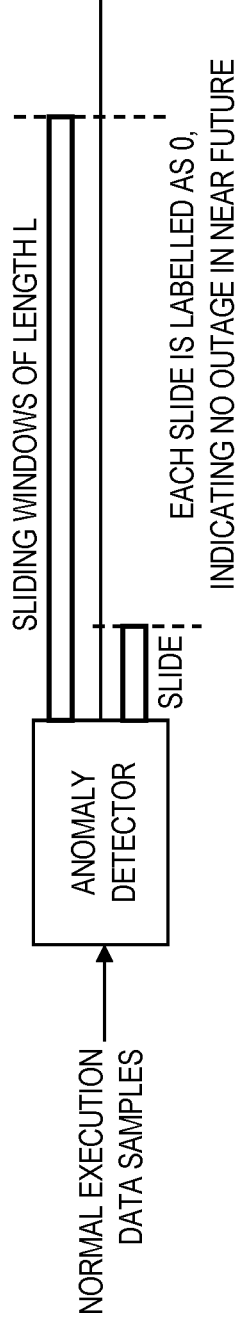

FIG. 3(A), FIG. 3(B), and FIG. 3(C) are diagrams illustrating data preparation and labelling, in accordance with one embodiment of the present invention. As shown in FIG. 3(A), an outage starts at $t_2$, a pre-incident period with respect to the outage starts from $t_0$ till $t_1$, and there is a period of lead time between $t_1$ and $t_2$. The period of lead time can be pre-configured. The data samples taken in pre-incident period the data samples include known anomalies with timestamps and are used as training data for the offline training phase.

As shown in FIG. 3(B), the time period between $t_0$ and $t_1$, where the data samples in a pre-incident period (or the prior failure execution samples) are taken, is divided by consecutive sliding windows with a length of L. In the time period between to and $t_1$, the consecutive sliding windows have N slides. Each slide of the consecutive sliding windows is assigned a label which is indicative of an outage in near future; for example, each slide of the consecutive sliding windows is labeled as 1.

As shown in FIG. 3(C), the normal execution samples is taken from a time period with the consecutive sliding windows with the length of L. In the time period of the normal execution samples being taken, the consecutive sliding windows also have N slides. Each slide of the consecutive sliding windows is assigned a label which is indicative of no outage in near future; for example, each slide of the consecutive sliding windows is labeled as 0.

Figure 4:
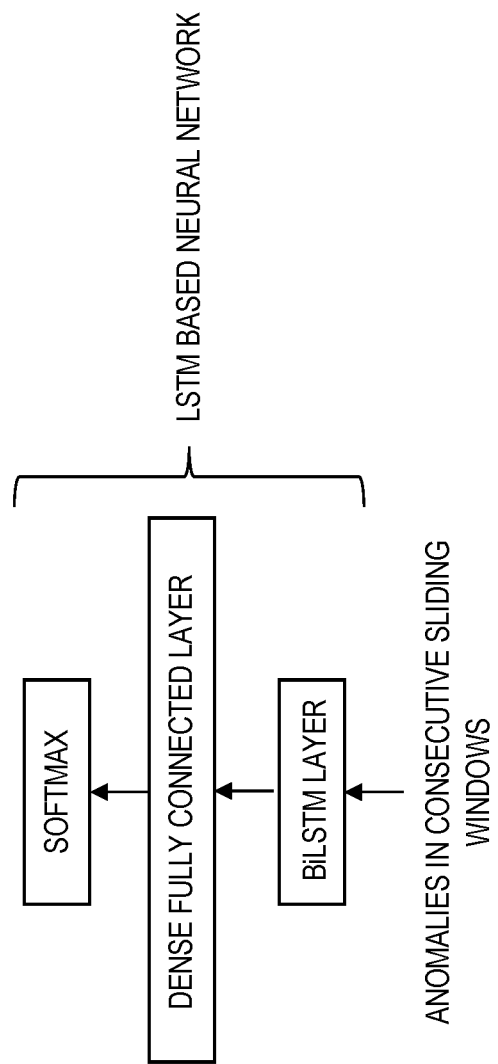
FIG. 4 is a diagram illustrating training a classification model in an offline training phase, in accordance with one embodiment of the present invention.

FIG. 4 is a diagram illustrating training a classification model in an offline training phase, in accordance with one embodiment of the present invention. Training the binary classification model uses an LSTM (long short-term memory) based neural network, which is illustrated in FIG. 4. Both labeled data samples in a pre-incident period and labeled normal execution samples from the N consecutive sliding windows are used as training data to be fed to the LSTM based neural network which include the BiLSTM (bidirectional LSTM) layer, dense fully connected layer, and SOFTMAX layer. The proposed system and method train the binary classification model with assigned labels of the N consecutive sliding windows, using a long short-term memory (LSTM) based neural network. Anomalies in the pre-incident period are malign while anomalies emerging from normal execution are benign. The LSTM based neural network helps capture the sequence of anomalies (i.e., the time order in which they anomalies occur) within each slide of consecutive sliding windows.

Figure 5:
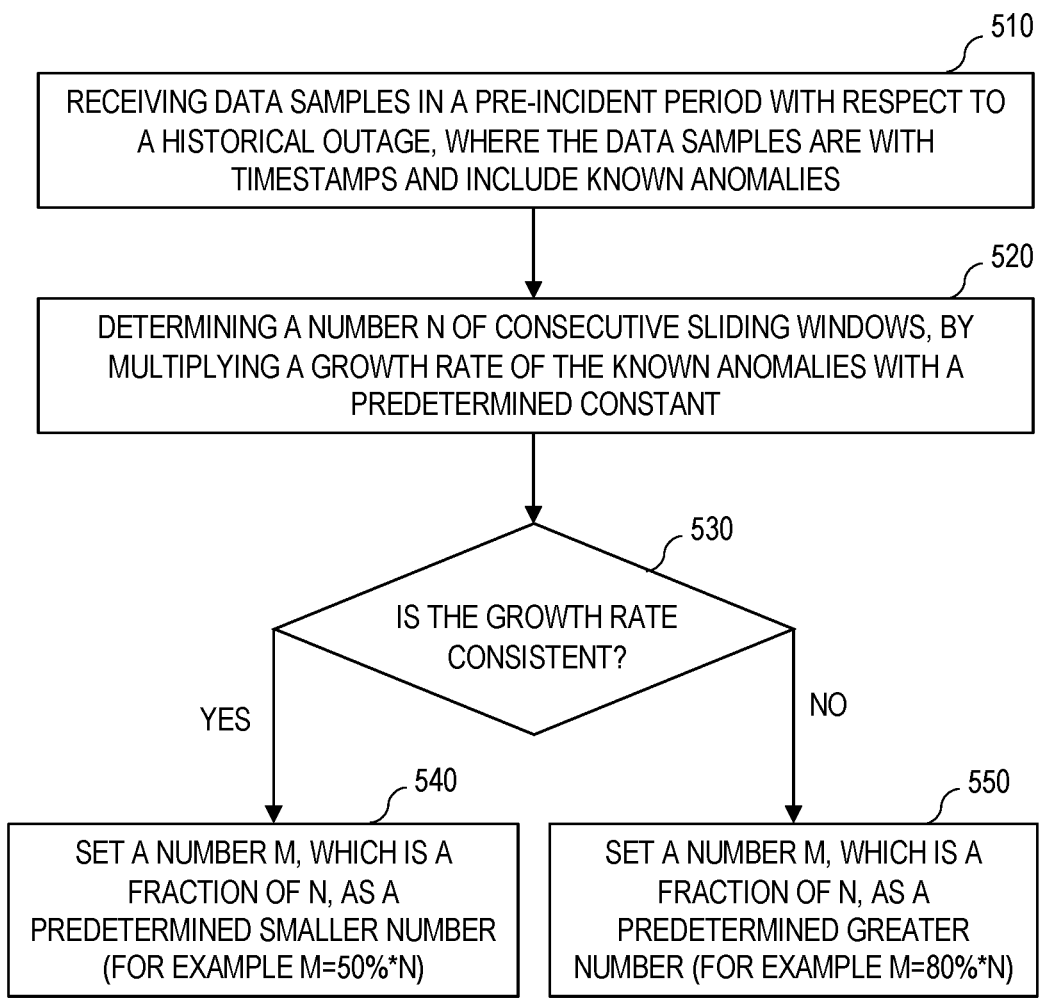
FIG. 5 is a flowchart showing operational steps of determining a number N of consecutive sliding windows and a number M which is a fraction of N, in accordance with one embodiment of the present invention.

FIG. 5 is a flowchart showing operational steps of determining a number of consecutive sliding windows and a number of sliding window in a subset of the consecutive sliding windows, in accordance with one embodiment of the present invention. The operational steps are performed on one or more computing devices or servers or on a computer system).

At step 510, the computer system receives data samples in a pre-incident period with respect to a historical outage. The data samples are with timestamps and include known anomalies. At step 520, the computer system determines a number N of consecutive sliding windows by multiplying a growth rate of the known anomalies with a predetermined constant. For example, if the predetermined constant is 4 and the growth rate of the known anomalies is 1.3, then the multifaction of the two number is 5.2; the number N will be 5. The growth rate of the anomalies determines what should be the number of the consecutive sliding windows with the length of L (or in the pre-incident period). If the growth rate is greater, then the computer system will segment more consecutive sliding windows (i.e., N will be higher); on the contrary, if the growth rate is less, then the computer system will segment less consecutive sliding windows (i.e., N will be lower).

At step 530, the computer system determines whether the growth rate of the known anomalies is consistent. In response to determining that the growth rate is consistent or does not change dramatically across the consecutive sliding windows (YES branch of decision 520), the computer system at step 540 sets a number M, which is a faction of N, as a predetermined smaller number. In response to determining that the growth rate is not consistent or change dramatically across the consecutive sliding windows (NO branch of decision 520), the computer system at step 550 sets the number M as a predetermined greater number. For example, if the growth rate of the anomalies is consistent, then the number M will be set as 50% of N; if the if the growth rate of the anomalies is not consistent, then the number M will be set as 80% of N.

Figure 6:
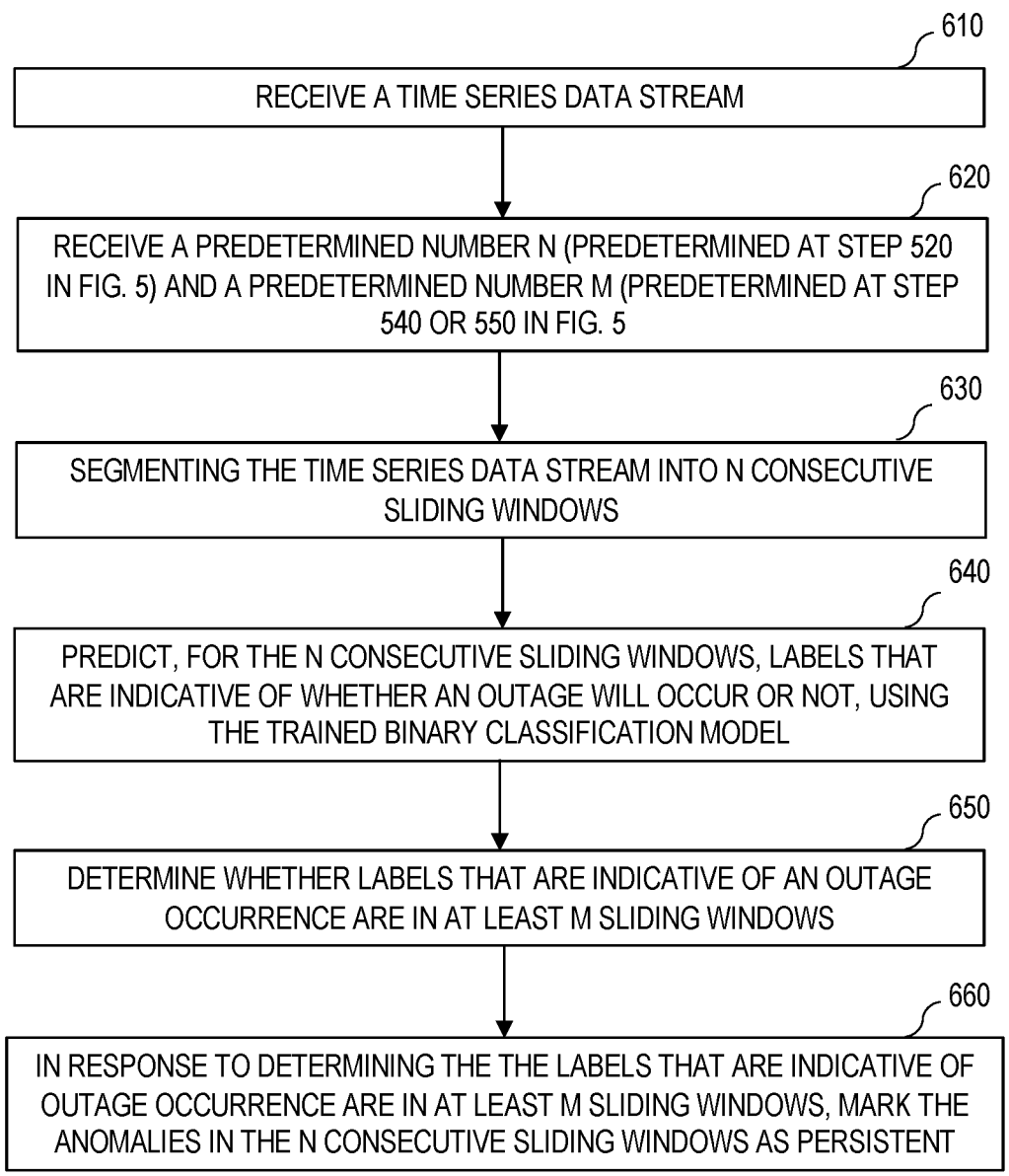
FIG. 6 is a flowchart showing operational steps of supervised detection of persistent anomalies, in accordance with one embodiment of the present invention.

FIG. 6 is a flowchart showing operational steps of supervised detection of persistent anomalies, in accordance with one embodiment of the present invention. The operational steps are performed on one or more computing devices or servers or on a computer system).

At step 610, the computer system receives a time series data stream. At step 620, the computer system receives a predetermined number N (predetermined at step 520 in FIG. 5) and a predetermined number M (predetermined at step 540 or 550 in FIG. 5), where N is the number of the total consecutive sliding windows and M is the number which is a fraction of N.

At step 630, the computer system segments the time series data stream into N consecutive sliding windows. At step 640, the computer system predicts, for the N consecutive sliding windows, labels that are indicative of whether an outage will occur or not, using the trained binary classification model. As described in a previous paragraph in the document, the computer system uses a long short-term memory (LSTM) based neural network to train the binary classification model.

At step 650, the computer system determines whether labels that are indicative of an outage occurrence are in at least M sliding windows. In response to determining that the labels that are indicative of the outage occurrence are in at least M sliding windows, at step 660, the computer system marks the anomalies in the N sliding windows as persistent.

Figure 7:
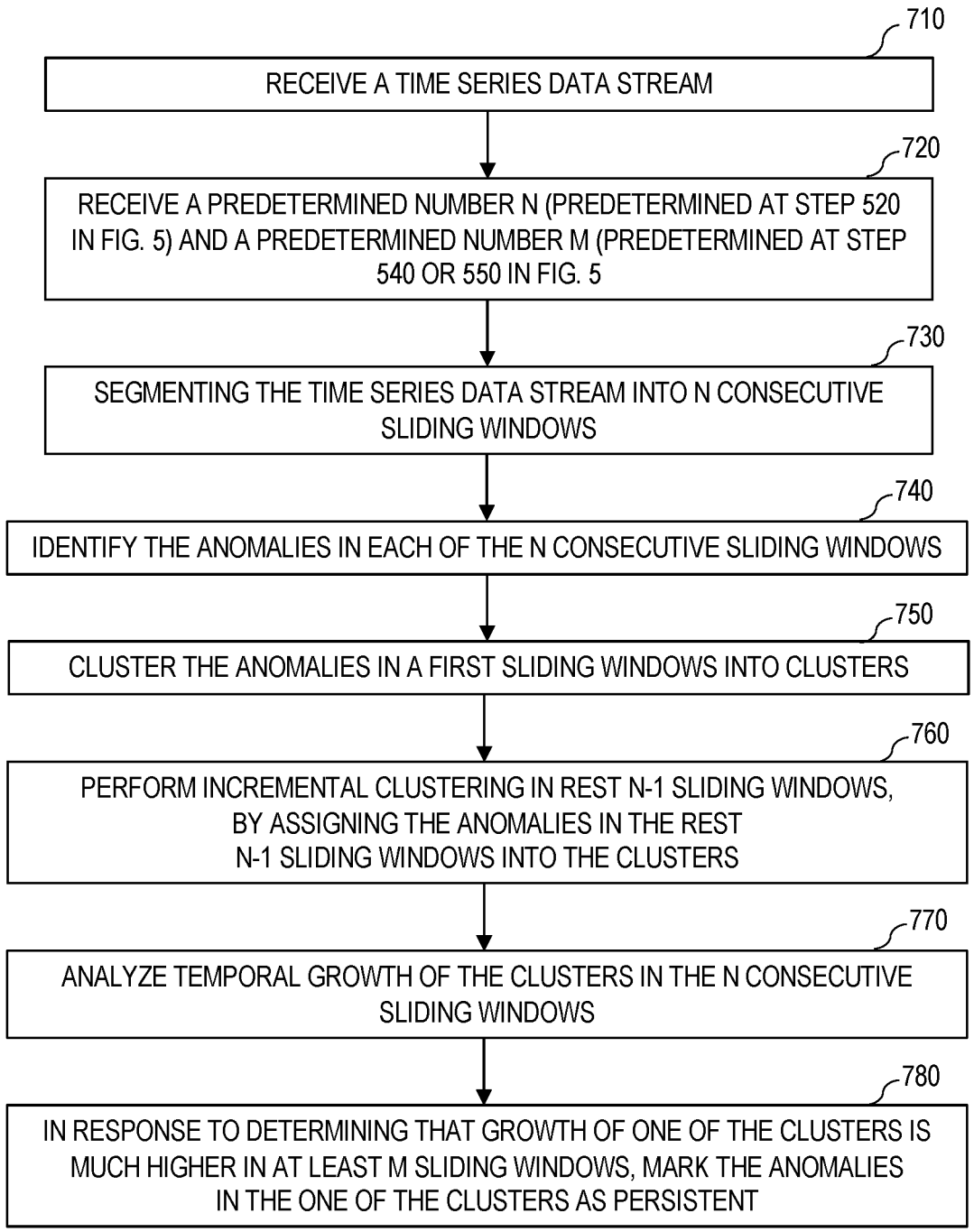
FIG. 7 is a flowchart showing operational steps of unsupervised detection of persistent anomalies, in accordance with one embodiment of the present invention.

FIG. 7 is a flowchart showing operational steps of unsupervised detection of persistent anomalies, in accordance with one embodiment of the present invention. The operational steps are performed on one or more computing devices or servers or on a computer system).

At step 710, the computer system receives a time series data stream. At step 720, the computer system receives a predetermined number N (predetermined at step 520 in FIG. 5) and a predetermined number M (predetermined at step 540 or 550 in FIG. 5), where N is the number of the total consecutive sliding windows and M is the number which is a fraction of N. At step 730, the computer system segments the time series data stream into N consecutive sliding windows.

At step 740, the computer system identifies the anomalies in each of the N consecutive sliding windows. The computer system checks data points in each of the N consecutive sliding windows to determine whether the anomalies occur.

At step 750, the computer system cluster the anomalies in a first sliding window into clusters. At this step, the anomalies in the first sliding window is grouped into clusters. At step 760, the computer system perform incremental clustering in rest N−1 sliding windows, by assigning the anomalies in the rest N−1 sliding windows into the clusters. For example, the anomalies are grouped into 3 different clusters in the first sliding window, any of the anomalies in the next N−1 windows is assigned to one of the 3 clusters based on the similarity of the anomaly data point with the cluster data points.

At step 770, the computer system analyzes temporal growth of the clusters in the N consecutive sliding windows. In response to determining that growth of one of the clusters is much higher in at least M sliding windows, at step 780, the computer system marks anomalies in the one of the clusters as persistent.

Figure 8:
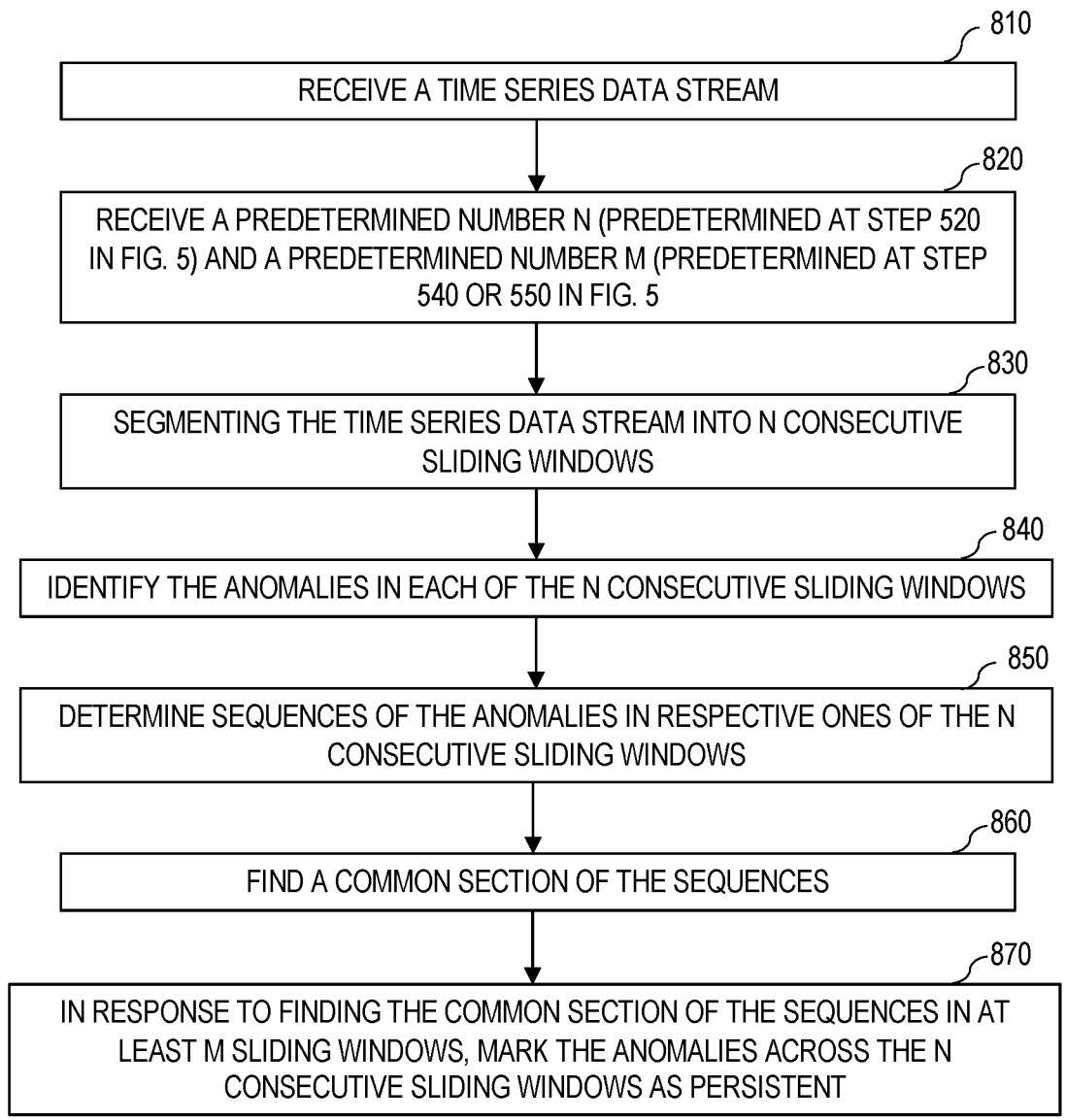
FIG. 8 is a flowchart showing operational steps of unsupervised detection of persistent anomalies, in accordance with another embodiment of the present invention.

FIG. 8 is a flowchart showing operational steps of unsupervised detection of persistent anomalies, in accordance with another embodiment of the present invention. The operational steps are performed on one or more computing devices or servers or on a computer system).

At step 810, the computer system receives a time series data stream. At step 820, the computer system receives a predetermined number N (predetermined at step 520 in FIG. 5) and a predetermined number M (predetermined at step 540 or 550 in FIG. 5), where N is the number of the total consecutive sliding windows and M is the number which is a fraction of N. At step 830, the computer system segments the time series data stream into N consecutive sliding windows.

At step 840, the computer system identifies the anomalies in each of the N consecutive sliding windows. The computer system checks data points in each of the N consecutive sliding windows to determine whether the anomalies occur.

At step 850, the computer system determines sequences of the anomalies in respective ones of the N consecutive sliding windows. At step 860, the computer system finds a common section of the sequences. For example, the computer system determines 3 sequences of the anomalies: 1 0 1 1 0, 0 0 1 1 0, and 0 1 1 1 0 (1 is indicative of an outage in near future and 0 is indicative of no outage in near future) in 5 consecutive sliding windows, and the computer system finds the common sequence is 1 1 0 across the 3 consecutive sliding windows. In response to finding the common section of the sequences in at least M sliding windows, at step 850, the computer system marks the anomalies across the N consecutive sliding windows as persistent.

Figure 9:
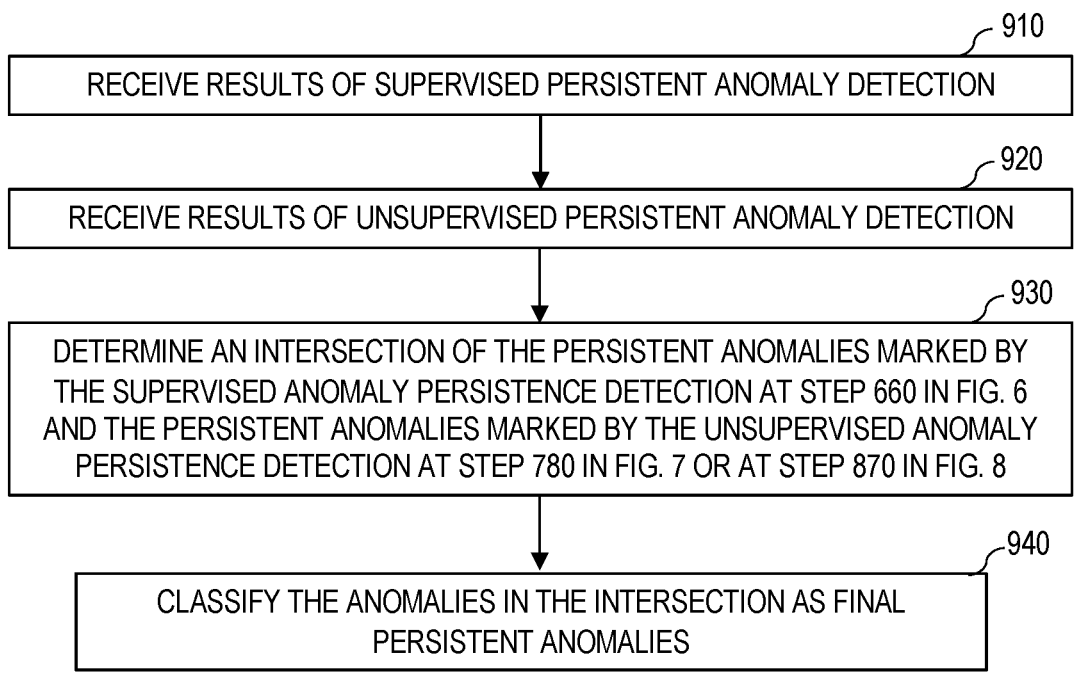
FIG. 9 is a flowchart showing operational steps of combining supervised detection of persistent anomalies and unsupervised detection of persistent anomalies, in accordance with one embodiment of the present invention.

FIG. 9 is a flowchart showing operational steps of combining supervised detection of persistent anomalies and unsupervised detection of persistent anomalies, in accordance with one embodiment of the present invention. The operational steps are performed on one or more computing devices or servers or on a computer system).

At step 910, the computer system receives results of supervised persistent anomaly detection. The results of the supervised persistent anomaly detection are those persistent anomalies marked at step 660 shown in FIG. 6. At step 920, the computer system receives results of unsupervised persistent anomaly detection. The results of the unsupervised persistent anomaly detection are those persistent anomalies marked at step 780 shown in FIG. 7 or those persistent anomalies marked at step 870 shown in FIG. 8.

At step 930, the computer system determines an intersection of the persistent anomalies marked by the supervised anomaly persistence detection at step 660 in FIG. 6 and the persistent anomalies marked by the unsupervised anomaly persistence detection at step 780 in FIG. 7 or at step 870 in FIG. 8. At step 940, the computer system classifies anomalies in the intersection as final persistent anomalies.

Figure 10:
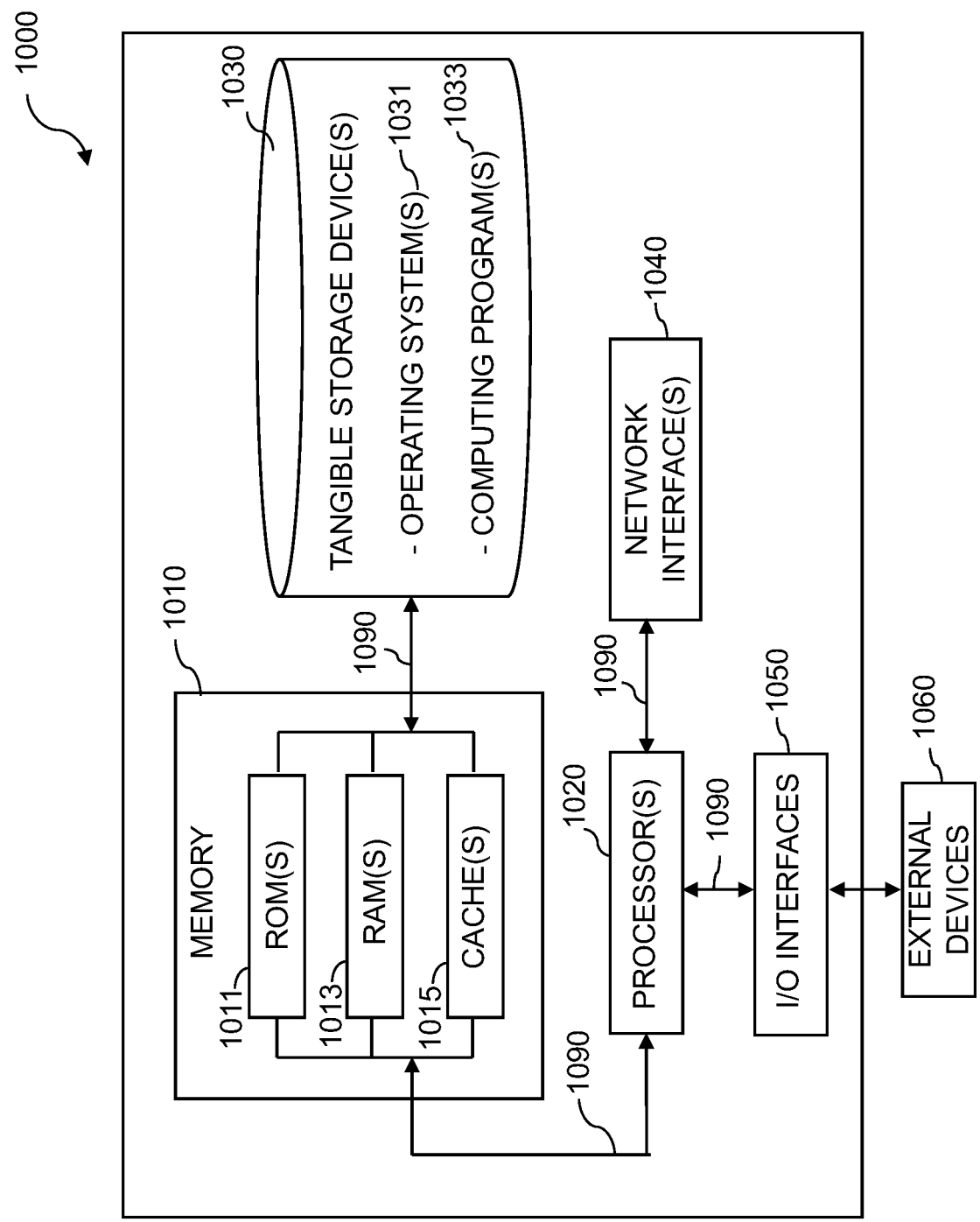
FIG. 10 is a diagram illustrating components of a computing device or server, in accordance with one embodiment of the present invention.

FIG. 10 is a diagram illustrating components of computing device or server 1000, in accordance with one embodiment of the present invention. It should be appreciated that FIG. 10 provides only an illustration of one implementation and does not imply any limitations; different embodiments may be implemented.

Referring to FIG. 10, computing device or server 1000 includes processor(s) 1020, memory 1010, and tangible storage device(s) 1030. In FIG. 10, communications among the above-mentioned components of computing device or server 1000 are denoted by numeral 1090. Memory 1010 includes ROM(s) (Read Only Memory) 1011, RAM(s) (Random Access Memory) 1013, and cache(s) 1015. One or more operating systems 1031 and one or more computer programs 1033 reside on one or more computer readable tangible storage device(s) 1030.

Computing device or server 1000 further includes I/O interface(s) 1050. I/O interface(s) 1050 allows for input and output of data with external device(s) 1060 that may be connected to computing device or server 1000. Computing device or server 1000 further includes network interface(s) 1040 for communications between computing device or server 1000 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
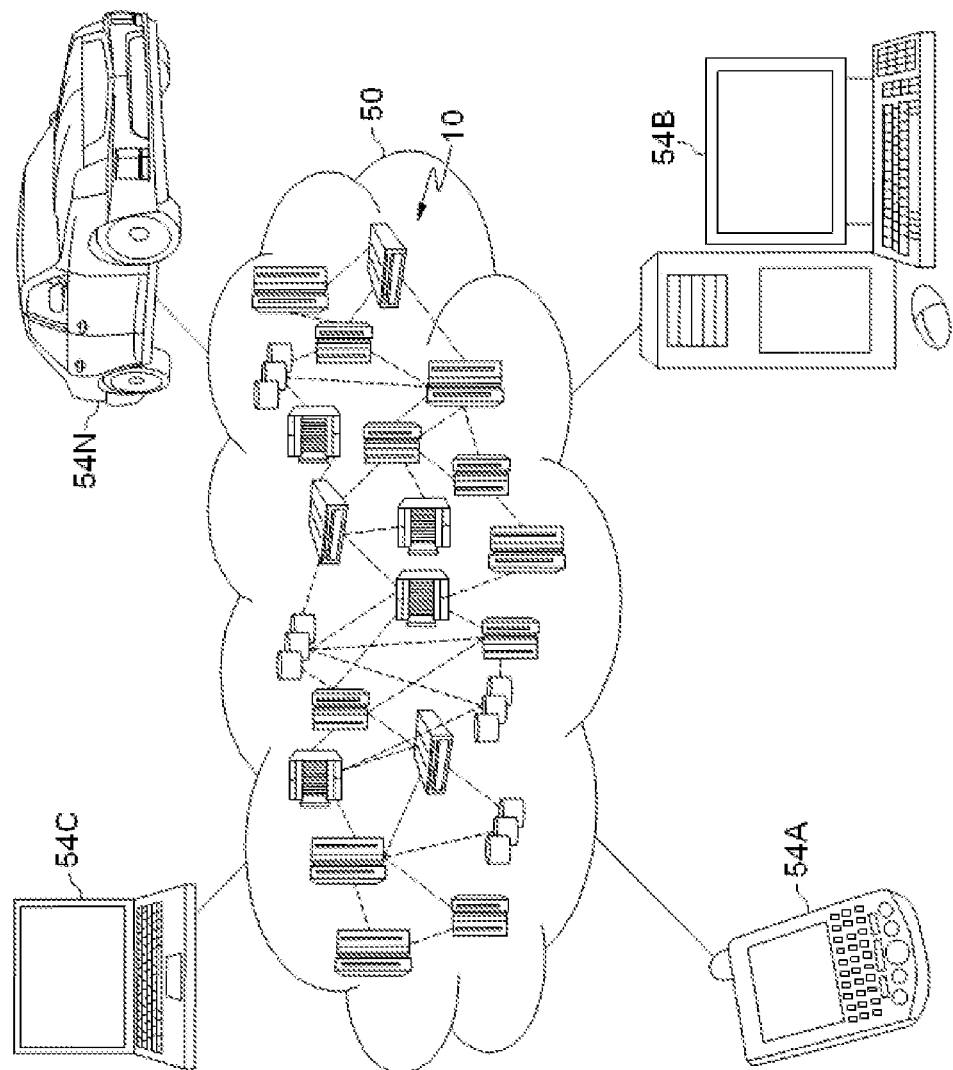
FIG. 11 depicts a cloud computing environment, in accordance with one embodiment of the present invention.

Referring now to FIG. 11, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 12:
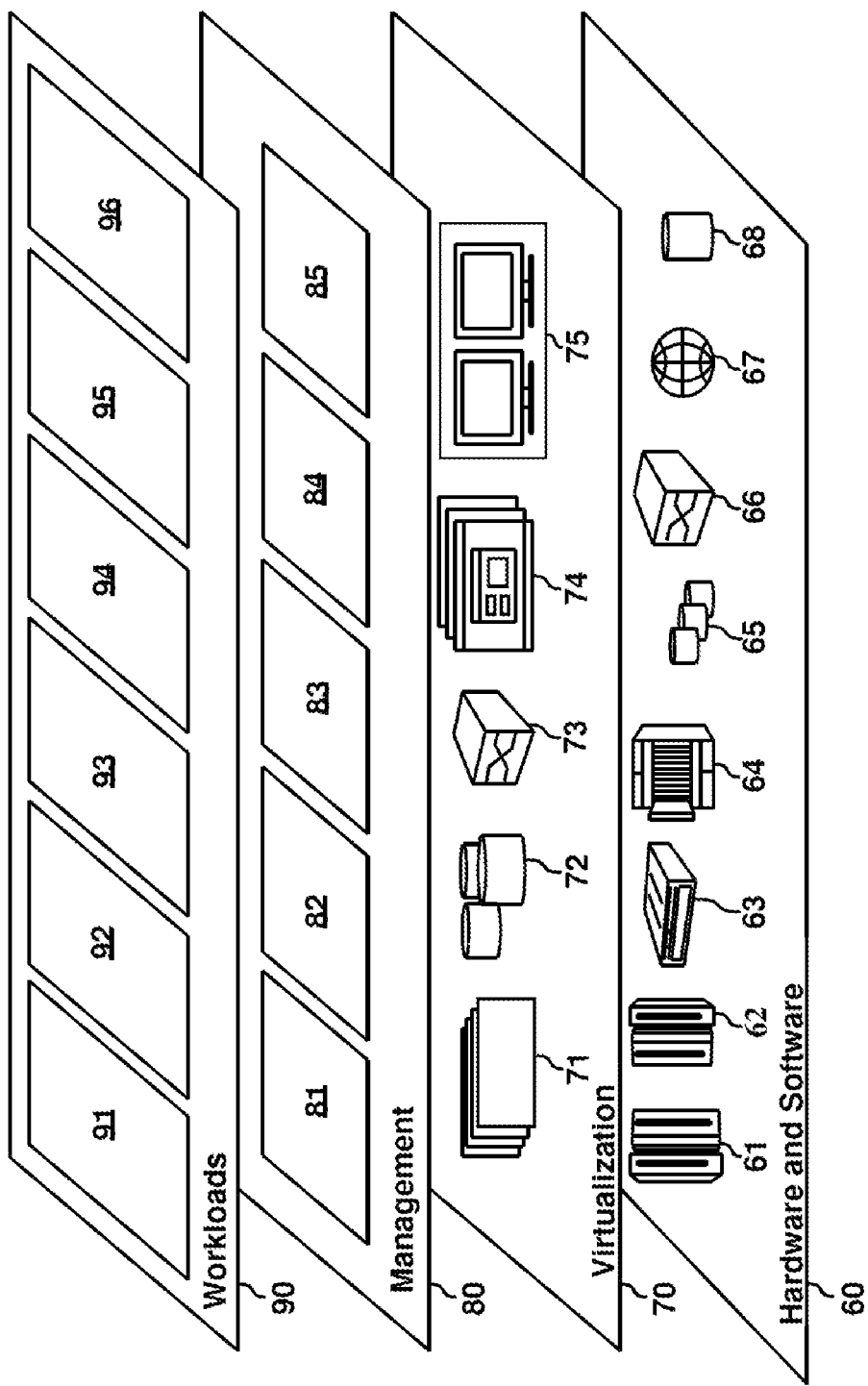
FIG. 12 depicts abstraction model layers in a cloud computing environment, in accordance with one embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of identifying persistent anomalies for failure prediction.

What is claimed is:

1. A computer-implemented method for identifying persistent anomalies for failure prediction, the method comprising:

receiving a time series data stream;

receiving a predetermined number N and a predetermined number M which is a fraction of N, wherein N and M are positive integers;

segmenting the time series data stream into N consecutive sliding windows;

performing supervised persistent anomaly detection to determine whether anomalies across the N consecutive sliding windows are persistent, based on a prediction that labels that arm indicative of an outage occurrence are in at least M sliding windows, by using a binary classification model;

performing unsupervised persistent anomaly detection to determine whether the anomalies across the N consecutive sliding windows are persistent, based on clustering the anomalies and growth of clusters of the anomalies in at least M sliding windows; and combining results of the supervised persistent anomaly detection and results of the unsupervised persistent anomaly detection to determine persistent anomalies.

2. The computer-implemented method of claim 1, for determining the predetermined number N and the predetermined number M, further comprising:

receiving data samples in a pre-incident period with respect to a historical outage, wherein the data samples are with timestamps and include known anomalies;

determining the predetermined number N, by multiplying a growth rate of the known anomalies with a predetermined constant;

determining whether the growth rate is consistent within the N consecutive sliding windows;

in response to determining that the growth rate is consistent, setting M as a predetermined smaller fraction of N; and in response to determining that the growth rate is not consistent, setting M as a predetermined greater fraction of N.

3. The computer-implemented method of claim 1, for training the binary classification model, further comprising:

receiving data samples in a pre-incident period with respect to a historical outage as training data and normal execution samples;

for the data samples in the pre-incident period, assigning each sliding window with a label which is indicative of the historical outage;

for the normal execution samples, assigning each sliding window with a label which is indicative of no historical outage; and training the binary classification model with assigned labels of the N consecutive sliding windows, using a long short-term memory (LSTM) based neural network.

4. The computer-implemented method of claim 1, for the supervised persistent anomaly detection, further comprising:

for the N consecutive sliding windows, predicting labels that are indicative of whether an outage will occur or not, using the binary classification model;

determining whether the labels that are indicative of the outage occurrence are in at least M sliding windows; and in response to determining that the labels that are indicative of the outage occurrence are in at least M sliding windows, marking the anomalies across the N consecutive sliding windows as persistent.

5. The computer-implemented method of claim 1, for the unsupervised persistent anomaly detection, further comprising:

identifying the anomalies in each of the N consecutive sliding windows;

clustering the anomalies in a first sliding windows into clusters;

performing incremental clustering in rest N−1 sliding windows, by assigning the anomalies in the rest N−1 sliding windows into the clusters;

analyzing temporal growth of the clusters; and in response to determining that the temporal growth of one of the clusters is much higher in at least M sliding windows, marking the anomalies in the one of the clusters as persistent.

6. The computer-implemented method of claim 1, for combining the results of the supervised persistent anomaly detection and the results of the unsupervised persistent anomaly detection, further comprising:

determining an intersection of persistent anomalies determined by the supervised persistent anomaly detection and persistent anomalies determined by the unsupervised persistent anomaly detection; and classifying anomalies in the intersection as final persistent anomalies.

7. A computer system for identifying persistent anomalies for failure prediction, the computer system comprising one or more processors, one or more computer readable tangible storage devices, and program instructions stored on at least one of the one or more computer readable tangible storage devices for execution by at least one of the one or more processors, the program instructions executable to:

receive a time series data stream;

receive a predetermined number N and a predetermined number M which is a fraction of N, wherein N and M are positive integers;

segment the time series data stream into N consecutive sliding windows;

perform supervised persistent anomaly detection to determine whether anomalies across the N consecutive sliding windows are persistent, based on a prediction that labels that are indicative of an outage occurrence are in at least M sliding windows, by using a binary classification model;

perform unsupervised persistent anomaly detection to determine whether the anomalies across the N consecutive sliding windows are persistent, based on clustering the anomalies and growth of clusters of the anomalies in at least M sliding windows; and combine results of the supervised persistent anomaly detection and results of the unsupervised persistent anomaly detection to determine persistent anomalies.

8. The computer system of claim 7, for determining the predetermined number N and the predetermined number M, further comprising program instructions executable to:

receive data samples in a pre-incident period with respect to a historical outage, wherein the data samples are with timestamps and include known anomalies;

determine the predetermined number N, by multiplying a growth rate of the known anomalies with a predetermined constant;

determine whether the growth rate is consistent within the N consecutive sliding windows;

in response to determining that the growth rate is consistent, set M as a predetermined smaller fraction of N; and in response to determining that the growth rate is not consistent, set M as a predetermined greater fraction of N.

9. The computer system of claim 7, for training the binary classification model, further comprising program instructions executable to:
receive data samples in a pre-incident period with respect to a historical outage and normal execution samples as training data;
for the data samples in the pre-incident period, assign each sliding window with a label which is indicative of the historical outage;
for the normal execution samples, assign each sliding window with a label which is indicative of no historical outage; and
train the binary classification model with assigned labels of the N consecutive sliding windows, using a long short-term memory (LSTM) based neural network.

10. The computer system of claim 7, for the supervised persistent anomaly detection, further comprising program instructions executable to:
for the N consecutive sliding windows, predict labels that are indicative of whether an outage will occur or not, using the binary classification model;
determine whether the labels that are indicative of the outage occurrence are in at least M sliding windows; and
in response to determining that the labels that are indicative of the outage occurrence are in at least M sliding windows, mark the anomalies across the N consecutive sliding windows as persistent.

11. The computer system of claim 7, for the unsupervised persistent anomaly detection, further comprising program instructions executable to:
identify the anomalies in each of the N consecutive sliding windows;
cluster the anomalies in a first sliding windows into clusters;
perform incremental clustering in rest N−1 sliding windows, by assigning the anomalies in the rest N−1 sliding windows into the clusters;
analyze temporal growth of the clusters; and
in response to determining that the temporal growth of one of the clusters is much higher in at least M sliding windows, mark the anomalies in the one of the clusters as persistent.

12. The computer system of claim 7, for combining the results of the supervised persistent anomaly detection and the results of the unsupervised persistent anomaly detection, further comprising program instructions executable to:
determine an intersection of persistent anomalies determined by the supervised persistent anomaly detection and persistent anomalies determined by the unsupervised persistent anomaly detection; and
classify anomalies in the intersection as final persistent anomalies.

13. A computer-implemented method for identifying persistent anomalies for failure prediction, the method comprising:
receiving a time series data stream;
receiving a predetermined number N and a predetermined number M which is a fraction of N, wherein N and M are positive integers;
segmenting the time series data stream into N consecutive sliding windows;
performing supervised persistent anomaly detection to determine whether anomalies across the N consecutive sliding windows are persistent, based on a prediction that labels that are indicative of an outage occurrence are in at least M sliding windows, by using a binary classification model;
performing unsupervised persistent anomaly detection to determine whether the anomalies across the N consecutive sliding windows are persistent, based on a common section of sequences of the anomalies in at least M sliding windows; and
combining results of the supervised persistent anomaly detection and results of the unsupervised persistent anomaly detection to determine persistent anomalies.

14. The computer-implemented method of claim 13, for determining the predetermined number N and the predetermined number M, further comprising:
receiving data samples in a pre-incident period with respect to a historical outage, wherein the data samples are with timestamps and include known anomalies;
determining the predetermined number N, by multiplying a growth rate of the known anomalies with a predetermined constant;
determining whether the growth rate is consistent within the N consecutive sliding windows;
in response to determining that the growth rate is consistent, setting M as a predetermined smaller fraction of N; and
in response to determining that the growth rate is not consistent, setting M as a predetermined greater fraction of N.

15. The computer-implemented method of claim 13, for training the binary classification model, further comprising:
receiving data samples in a pre-incident period with respect to a historical outage and normal execution samples as training data;
for the data samples in the pre-incident period, assigning each sliding window with a label which is indicative of the historical outage;
for the normal execution samples, assigning each sliding window with a label which is indicative of no historical outage; and
training the binary classification model with assigned labels of the N consecutive sliding windows, using a long short-term memory (LSTM) based neural network.

16. The computer-implemented method of claim 13, for the supervised persistent anomaly detection, further comprising:
for the N consecutive sliding windows, predicting labels that are indicative of whether an outage will occur or not, using the binary classification model;
determining whether the labels that are indicative of the outage occurrence are in at least M sliding windows; and
in response to determining that the labels that are indicative of the outage occurrence are in at least M sliding windows, marking the anomalies across the N consecutive sliding windows as persistent.

17. The computer-implemented method of claim 13, for the unsupervised persistent anomaly detection, further comprising:
identifying the anomalies in each of the N consecutive sliding windows;
determining the sequences of the anomalies in respective ones of the N consecutive sliding windows;
finding a common section of the sequences; and
in response to finding the common section in at least M sliding windows, marking the anomalies across the N consecutive sliding windows as persistent.

18. The computer-implemented method of claim 13, for combining the results of the supervised persistent anomaly detection and the results of the unsupervised persistent anomaly detection, further comprising:

determining an intersection of persistent anomalies determined by the supervised persistent anomaly detection and persistent anomalies determined by the unsupervised persistent anomaly detection; and classifying anomalies in the intersection as final persistent anomalies.

19. A computer system for identifying persistent anomalies for failure prediction, the computer system comprising one or more processors, one or more computer readable tangible storage devices, and program instructions stored on at least one of the one or more computer readable tangible storage devices for execution by at least one of the one or more processors, the program instructions executable to:

receive a time series data stream;

receive a predetermined number N and a predetermined number M which is a fraction of N, wherein N and M are positive integers;

segment the time series data stream into N consecutive sliding windows;

perform supervised persistent anomaly detection to determine whether anomalies across N consecutive sliding windows are persistent, based on a prediction that labels that are indicative of an outage occurrence are in at least M sliding windows, by using a binary classification model;

perform unsupervised persistent anomaly detection to determine whether the anomalies across the N consecutive sliding windows are persistent, based on a common section of sequences of the anomalies in at least M sliding windows; and combine results of the supervised persistent anomaly detection and results of the unsupervised persistent anomaly detection to determine persistent anomalies.

20. The computer system of claim 19, for determining the predetermined number N and the predetermined number M, further comprising program instructions executable to:

receive data samples in a pre-incident period with respect to a historical outage, wherein the data samples are with timestamps and include known anomalies;

determine the predetermined number N, by multiplying a growth rate of the known anomalies with a predetermined constant;

determine whether the growth rate is consistent within the N consecutive sliding windows;

in response to determining that the growth rate is consistent, set M as a predetermined smaller fraction of N; and in response to determining that the growth rate is not consistent, set M as a predetermined greater fraction of N.

21. The computer system of claim 19, for training the binary classification model, further comprising program instructions executable to:

receive data samples in a pre-incident period with respect to a historical outage and normal execution samples as training data;

for the data samples in the pre-incident period, assign each sliding window with a label which is indicative of the historical outage;

for the normal execution samples, assign each sliding window with a label which is indicative of no historical outage; and train the binary classification model with assigned labels of the N consecutive sliding windows, using a long short-term memory (LSTM) based neural network.

22. The computer system of claim 19, for the supervised persistent anomaly detection, further comprising program instructions executable to:

for the N consecutive sliding windows, predict labels that are indicative of whether an outage will occur or not, using the binary classification model;

determine whether the labels that are indicative of the outage occurrence are in at least M sliding windows; and in response to determining that the labels that are indicative of the outage occurrence are in at least M sliding windows, mark the anomalies across the N consecutive sliding windows as persistent.

23. The computer system of claim 19, for the unsupervised persistent anomaly detection, further comprising program instructions executable to:

identify the anomalies in each of the N consecutive sliding windows;

determine the sequences of the anomalies in respective ones of the N consecutive sliding windows;

find a common section of the sequences; and in response to finding the common section in at least M sliding windows, mark the anomalies across the N consecutive sliding windows as persistent.

24. The computer system of claim 19, for combining the results of the supervised persistent anomaly detection and the results of the unsupervised persistent anomaly detection, further comprising program instructions executable to:

determine an intersection of persistent anomalies determined by the supervised persistent anomaly detection and persistent anomalies determined by the unsupervised persistent anomaly detection; and identify anomalies in the intersection as final persistent anomalies.

\* \* \* \* \*